Aug. 30, 1955 P. E. CLIPFELL 2,716,560
TRAILER TONGUE CLAMP
Filed July 15, 1954
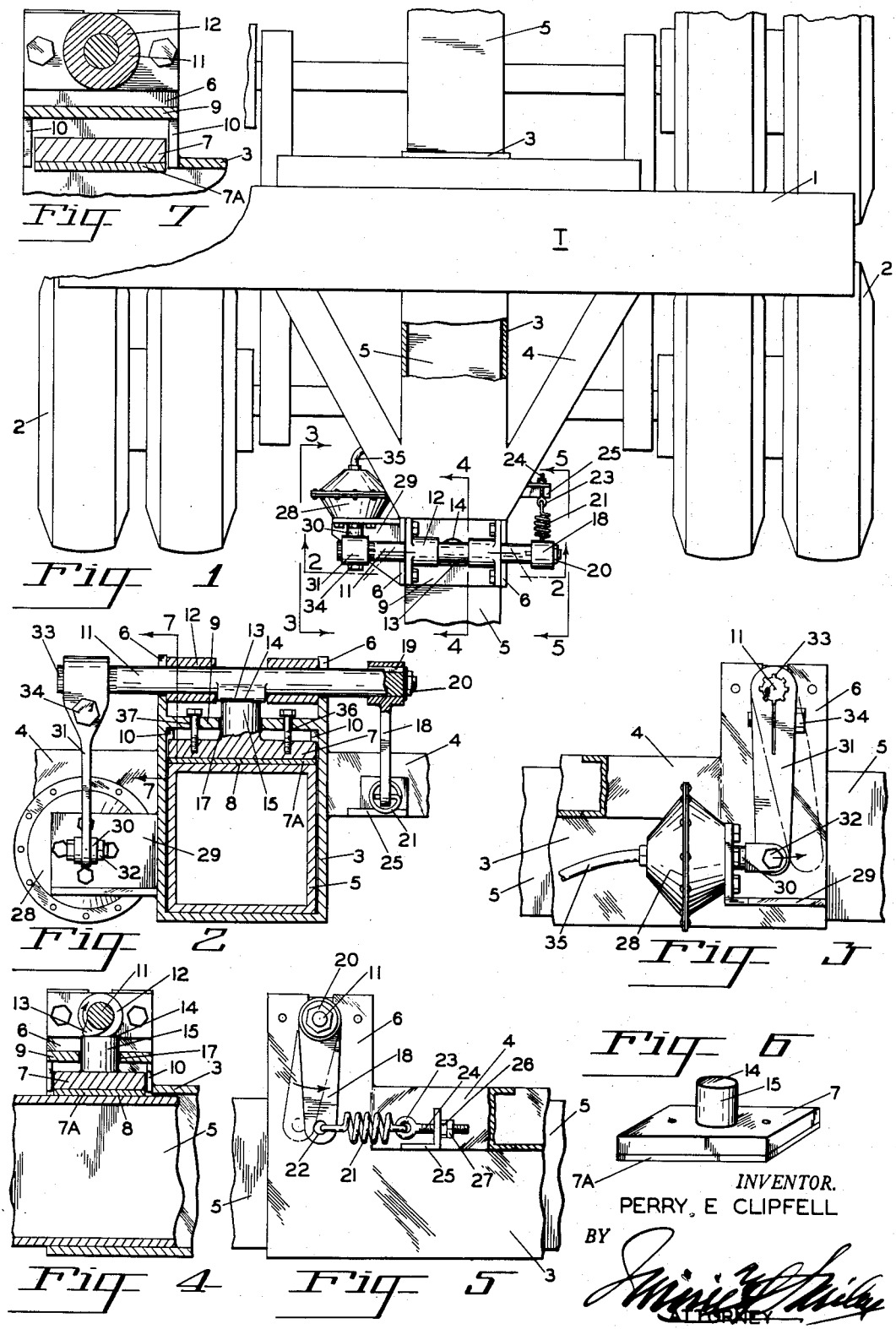
INVENTOR.
PERRY E. CLIPFELL

United States Patent Office 2,716,560
Patented Aug. 30, 1955

2,716,560

TRAILER TONGUE CLAMP

Perry E. Clipfell, Mehama, Oreg.

Application July 15, 1954, Serial No. 443,475

2 Claims. (Cl. 280—142)

This invention relates generally to trailer securing means and is particularly concerned with the adjustable and releasable securement of trailer components wherein one pair of wheels is longitudinally adjustable with respect to a companion pair of wheels to accommodate the length of the total trailer to the length of the load to be supported.

Trailers of the type referred to are commonly employed in the lumber industry for the transportation of logs. Such trailers include one wheeled truck providing a central hollow tongue receiving frame together with tongue securing means and a second wheeled truck having a tongue adjustable and releasably secured in the tongue receiving frame of the first mentioned truck.

It is among the objects of the present invention to provide a novel and improved means for securing the tongue of one trailer truck within the tongue receiving frame of a companion trailer truck.

Another object of the invention is to provide a trailer tongue clamp remotely operable, as from the cab of a traction truck for the trailer, to engage or release a trailer tongue without manual manipulation at the point of tongue engagement.

A further object is to provide in combination with a normally operative tongue engaging means, power means for releasing the tongue for adjustment or separation.

It is also an object of the invention to provide spring means biased toward tongue clamping position and remotely controllable fluid pressure means for releasing the spring pressure when an adjustment of trailer tongue to trailer tongue receiving structure is desired.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts through the several figures and in which:

Figure 1 is a top plan view of a logging trailer truck embodying one preferred form of my present invention;

Figure 2 is a sectional view of the clamp mechanism of the truck in Figure 1 taken on line 2—2 thereof;

Figure 3 is a detailed side elevation of the tongue clamp releasing means taken on line 3—3 of Figure 1;

Figure 4 is a sectional view, taken on line 4—4 of Figure 1;

Figure 5 is a detailed side elevation of the tongue clamping means taken on line 5—5 of Figure 1;

Figure 6 is a perspective view of the clamping shoe, and

Figure 7 is a sectional view, taken on line 7—7 of Figure 2.

In that form of the invention here presented by way of illustration the tongue receiving truck of a logging trailer assembly is indicated by the letter T and comprises the usual bunk 1 mounted on the wheels 2 in the usual manner. A short hollow tongue receiving frame or channel 3 is secured to the bunk 1 and braced by the framework 4. The hollow tongue receiving frame 3 is adapted to receive the tongue 5 of a companion wheeled truck not shown. The trailer T is adjustable along the tongue 5 to space the trucks with relation to the length of logs to be transported or to close couple the trucks for empty travel.

For locking the tongue 5 at the desired location within the tongue receiving frame 3, the frame 3 is provided with upwardly extending ears 6 which are formed integral with the tongue receiving frame 3. The top of the frame 3 is cut away between the ears 6 to receive a brake shoe 7 adapted to engage the top 8 of the tongue 5. This brake shoe is held in place by a transverse bridge plate 9, which bridges between the ears 6 and forms part thereof. Guides 10 form part of the ears and are adapted to guide the four corners of the brake shoe 7 in its vertical movement. A shaft 11 is journalled within bearings 12 transversely of the tongue and above the brake shoe 7, the bearings 12, being here shown, as integral with the ears 6.

For applying pressure by the shoe 7 against the surface 8 a cam 13 is formed on the shaft 11 and is adapted to contact the upper surface 14 of the pedestal 15, forming part of the brake shoe 7. Pedestal 15 extends up through the opening 17 of the bridge 9, as best illustrated in Figures 2 and 4. A lever 18 is keyed to the shaft 11 by a key 19 and locked thereon by a nut 20. The lever 18 normally is held in pressure applying position illustrated in Figure 5 by the spring 21, one end of which enters the opening 22 of the lever, while its opposite end enters the eye 23 of the eyebolt 24, anchored to the bracket 25. A nut 26 provides for adjustment of tension on the spring 21 as desired and is locked by a locking nut 27. The spring 21 exerts a continuous pull on the lever 18, rotating the shaft 11 in a direction to cause the cam 13 to force the pedestal 15 and the brake shoe 7 downwardly against the top 8 of the tongue 5, preventing the tongue from moving within the tongue receiving frame 3.

In order to unlock or release the brake shoe from the tongue an air cylinder 28 is secured to the braces 4 and the tongue receiving frame 3 by a bracket 29. A piston rod 30 is pivotally connected to the lower end of the lever 31 at 32, the lever 31 being keyed to the shaft 11 by the splines 33 and clamped thereto by the clamping bolt 34. The cylinder 28 receives air through a hose line 35 from a remotely positioned air valve, preferably within the cab of a traction truck, not shown, and controlled by the operator.

In operation the spring 21 biases the lever 18 in the direction of the arrow at all times, thus, causing the cam 13 to push downwardly on the pedestal 15 of the brake shoe 7, applying its face or brake lining 7 to the upper surface 8 of the tongue 5 and preventing the tongue from moving within the hollow receiving frame 3. When it is desired to move the tongue 5 forward or backward within the hollow tongue receiving frame 3, the operator applies air pressure through the hose line 35 from the valve, not shown, thereby forcing the piston rod 30 of the air cylinder in the direction of the arrow, Fig. 3, moving the lever 31 to the broken line position and rotating the shaft 11 to move the lever 18 to the dotted position, as illustrated in Figure 5. Such movement will overcome the spring tension 21 and rotate the cam 13 in the direction of the arrow, Fig. 4, so that the pedestal 15 will raise slightly, together with the brake shoe 7, thus permitting the tongue 5 to be adjusted forward or backward within the hollow receiving frame 3. It may readily be seen that in order to release the tongue 5, the operator must apply air pressure to the cylinder 28, thereby definitely releasing the brake shoe from the tongue 5, however, as soon as he releases the control valve the brake shoe will again apply itself to the tongue 5. Cap screws 36 are tapped into the brake shoe 7 and operate within the opening 37 of the bridge plate 9. The object of these screws is to prevent the brake shoe from dropping out of its position in the event the tongue 5 were removed from the trailer.

Although a certain specific embodiment of the invention has been shown and described, it is obvious that many modifications thereof are possible. The invention, therefore, is not to be restricted except in so far as is necessitated by the prior art and by the spirit of the appended claims.

What I claim is:

1. In combination, a trailer having a hollow tongue receiving frame, a tongue slidably carried within the frame, tongue engaging means positioned within the frame, a cam journalled on said frame and operatively connected with the tongue engaging means, spring-urged means biasing the cam rotatively to actuate the tongue-engaging means, and pressure operated means for counterrotating the cam in opposition to said spring-urged means for releasing the tongue-engaging means.

2. The combination of claim 1 wherein said cam is fixed with a shaft extending transversely of and journalled on said frame, said spring-urged means including a crank lever fixed to one end of said shaft and a spring anchored between said crank lever and said frame, and said pressure operated means including a second crank lever fixed on the other end of said shaft and a fluid operated jack mounted on said frame and having a piston rod connected to said second crank lever.

References Cited in the file of this patent

UNITED STATES PATENTS

| | | |
|---|---|---|
| 815,057 | Abbott | Mar. 13, 1906 |
| 2,485,251 | Alger | Oct. 18, 1949 |
| 2,589,678 | DeLay | Mar. 18, 1952 |
| 2,614,864 | Bean | Oct. 21, 1952 |